Oct. 17, 1933. O. U. ZERK 1,931,121
LUBRICATING APPARATUS
Filed Oct. 16, 1929
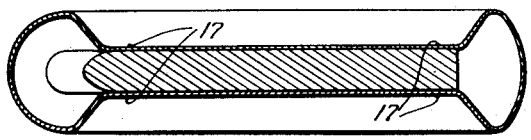
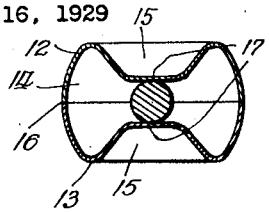
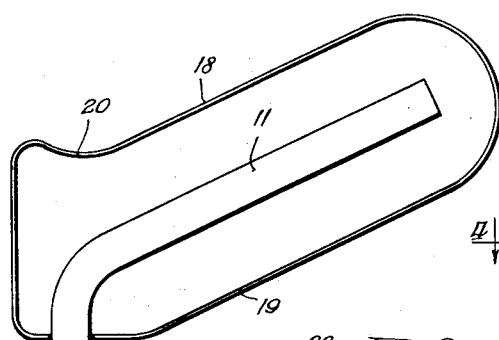
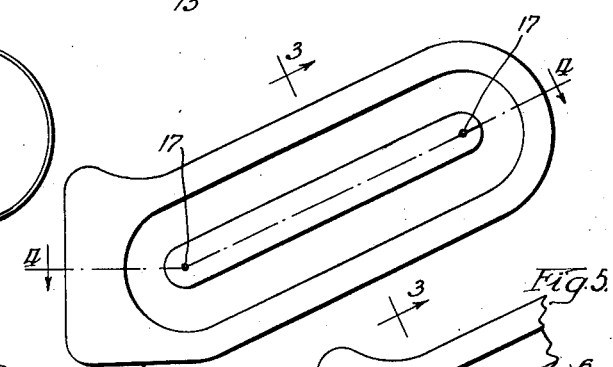
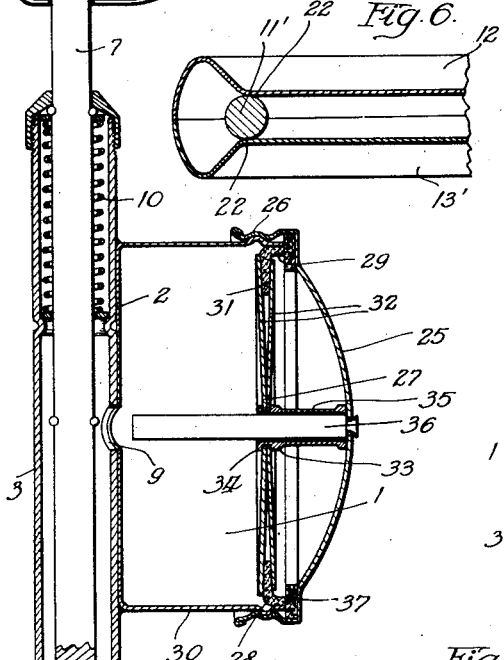
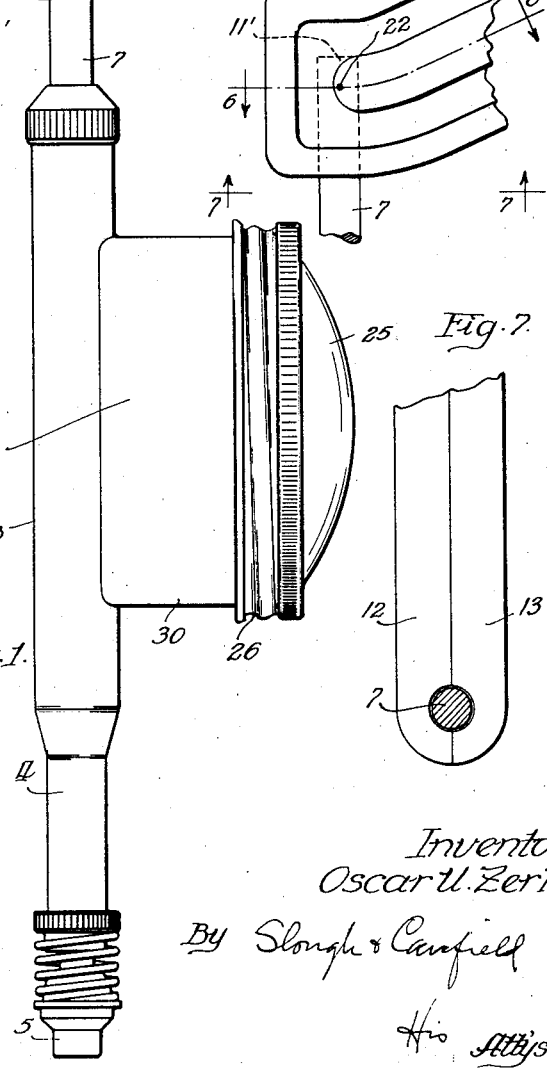
Inventor:
Oscar U. Zerk
By Slough & Canfield
His Attys Patented Oct. 17, 1933

1,931,121

UNITED STATES PATENT OFFICE 1,931,121

LUBRICATING APPARATUS

Oscar U. Zerk, Chicago, Ill., assignor to Alemite Corporation, Chicago, Ill., a corporation of Delaware Application October 16, 1929. Serial No. 399,961

12 Claims. (Cl. 221—47.4)

My present invention relates to lubricating apparatus, and relates more particularly to that type of lubricating apparatus commonly known as grease guns and oil guns, employed chiefly for the purpose of applying lubricant to the lubricant receiving bearing nipples of an automobile chassis or other mechanism requiring occasional lubrication.

The apparatus of my present invention is especially adapted for use in connection with the lubrication of automotive vehicles and the lubrication of industrial machines, although it is not limited to such uses. In the lubrication of the chassis bearings for automotive vehicles and the bearings of stationary mechanisms of various kinds, two general types of lubricating apparatus are commonly used:

First, the type employing an interlocking coupling mechanism for temporarily rigidly interlocking the nozzle of the lubricating gun, and a suitably formed lubricant receiving nipple, affixed to the bearing, during the lubricating operation; second, the type wherein lubricant communicating contact between the nozzle and nipple is maintained during lubrication by manual thrust of the nozzle against the nipple.

Although my present invention is applicable to both of the aforesaid general types of apparatus, it is believed to have a more particular application to lubricant dispensing guns of the second type, hereinafter referred to as the contact type.

The present invention involves certain improvements over the general type of apparatus described and claimed in my copending application, Serial No. 396,354, filed September 30, 1929, for improvements in lubricating guns, to which reference may be had for a detailed description of certain features of construction, and certain phase of the mode of operation pertaining thereto, which are possessed in common by the embodiments of my invention hereinafter illustrated and described, and embodiments of invention of my said copending application, disclosed therein.

Although, also, I preferably provide the gun of my present invention with a nipple engaging nozzle of such form that the lubricant, dispensing barrel of the gun can be oscillated from axial alignment with the nipple to place the gun in such a position that it will not be engaged with any adjacent part of the mechanism carrying the nipple, while still maintaining lubricant dispensing contact with the nipple, such as is particularly disclosed and claimed in my copending application for United States Letters Patent, Serial No. 396,352, filed September 30, 1929, my invention in its broader aspects may be embodied in lubricant guns having other nozzle constructions adaptable for use in connection with other forms of nipples, as will be apparent to those skilled in the art to which my invention appertains.

Although my invention in certain of its phases is not limited thereto, it may be very advantageously embodied in a lubricant gun of the type exemplified by the lubricant gun construction disclosed in my first said copending application wherein the lubricant reservoir is in the form of a relatively shallow cup of, preferably sheet metal construction supported laterally on a relatively slender tube supporting on its one end a lubricant dispensing nozzle and having a handle projected from its other end, as fully described and shown in said first named copending application.

An object of my invention is to provide a lubricant gun of improved construction adaptable for ready application to suitably formed lubricant receiving nipples and to efficiently supply lubricant thereto.

Another object of my invention is to provide an improved lubricating gun adaptable for dispensing lubricant in either the form of oil or of grease, to lubricant receptacles of suitable form.

Another object of my invention is to provide an improved hand grip element for lubricant guns.

Another object of my invention is to provide an improved sheet metal hand grip element for lubricant dispensing apparatus.

Another object of my invention is to provide an improved oil dispensing apparatus.

Another object of my invention is to provide an improved lubricating gun which may be readily manufactured in quantities at low cost, said gun being of such improved construction as to perform its intended lubricant storing and dispensing functions in a highly efficient manner.

Another object of my invention is to provide an improved follower mechanism for a lubricant storage chamber of improved form.

Another object of my invention is to provide a lubricant gun having a highly efficient form of lubricant storage chamber with an improved follower mechanism therefor, and improved means for readily and expeditiously positioning the parts for operation, and for disassociating said parts for refilling the chamber with lubricant.

Another object of my invention is to provide an improved lubricating gun having a nipple engaging nozzle at one end with a hand grip of sheet metal construction at its other end, inexpensively made and applied and of a highly efficient form.

Another object of my invention is to provide a hand grip of sheet metal construction for a lubricant gun of the contact type wherein the hand grip is so formed as to take the manual thrust, during a lubricating operation, upon a surface thereof of substantial area, so formed as to comfortably engage the fleshy portion of the hand between the thumb and forefinger, whereby slipping of the hand relative to the grip during operation of the gun is avoided.

Other objects of my invention and the invention itself will be readily apparent to those skilled in the art to which my invention appertains, from the accompanying description of certain embodiments of my invention illustrated in the drawing showing said embodiment.

Referring now to the drawing:

Figure 1 is a view in side elevation of a lubricant gun which is an embodiment of my invention;

Figure 2 is a view in longitudinal medial section of the gun of Figure 1;

Figure 3 is a section taken on the line 3—3 of Figure 1;

Figure 4 is a section taken on the line 4—4 of Figure 1, the view being of the hand grip only;

Figure 5 is a side elevational view of a fragment of hand grip which is an alternate form of hand grip to that illustrated in Figure 1;

Figure 6 is a section taken on the line 6—6 of Figure 5, and

Figure 7 is a sectional view taken on the line 7—7 of Figure 5.

Referring now, first, to Figures 1 to 4, inclusive, in all of which like parts are designated by like reference characters, at 1 I show a lubricant containing reservoir in the form of a shallow cup, affixed by an end wall to an intermediate portion of a lateral wall of a relatively slender tube 3 from a reduced cylindrical end portion 4 of which lubricant previously communicated thereto from the reservoir 1 is adapted to be ejected at high pressure through a dispensing nozzle 5 by a forward movement of a piston 6 into the cylinder.

This is accomplished by a manual thrust effort by the operator upon a piston rod 7, having a handle portion disposed externally of the tube 3, directed longitudinally of the tube towards the nozzle 5, the pressure resulting from the manual thrust effort putting the lubricant in the cylinder 4 under a high degree of compression, and establishing a pressure maintained lubricant sealing contact between the nozzle 5 and that particular nipple, such as 8, with which the nozzle at the time may be associated.

The shallow cup 1 supplies lubricant through communicating orifices 9 of the cup end wall 2 and a wall of the tube 3 to the tube to replenish the supply of lubricant therein for the amount of lubricant dispensed from its cylindrical portion 4, after each dispensing operation of the gun, upon relative retraction of the piston and cylinder by force communicated to the piston rod by the spring 10.

The apparatus above described is fully and specifically described in my aforesaid copending applications and is, therefore, but generally described herein, reference being respectively had to my aforesaid copending applications; viz, to my first named application, for the gun construction, and to my second named application, for the construction of nozzle and nipple coupling disclosed herein, wherein the nozzle is universally joined to the end of the gun.

In the embodiment of my invention shown in Figures 1 to 4, inclusive, the piston rod 7 terminates exteriorly of the tube 3 in an angularly disposed end 11 to which a sheet metal hand grip comprising a pair of laterally disposed halves 12 and 13 is affixed. Each of the halves 12 and 13 are preferably in the form of sheet metal stampings having curved lateral walls defining an interior depression 14 in to which a reentrant intermediate wall portion 15 projects. The edges of the lateral walls of the sheet metal halves 12 and 13 are brought together in contiguous abutting relation, engaging along a line 16 with the reentrant wall portions 15 of the two halves engaging opposite sides of the interposed angularly disposed end 11 of the piston rod.

At 17, Figures 1, 3 and 4, the abutting surfaces of the rod portion 11 and reentrant sheet metal portions 15 are welded together by a spot welding operation, or otherwise, the two halves of the handle are rigidly secured to the intermediate rod portion 11 with their bounding edges in abutting engagement.

The sheet metal stampings forming the halves 12 and 13, together, form a pistol grip for the rod portion 11, rigidly secured thereto, having an outer surface engageable by the hand of the operator which is transversely convexly curved on its rearward surface 18 and its forward surface 19, and which convexly curved relatively rearward surface 18 is longitudinally concavely curved at a portion 20 which is engageable by the fleshy part of the operator's hand when the hand grip is gripped in the manner most convenient for exercising a thrust effort on the rod 7.

In Figures 5, 6 and 7 I show a hand grip construction otherwise like that shown in the foregoing Figures 1 to 4, inclusive, but in which the angular portion 11 of the rod 7 is omitted, the rod 7 terminating in an axially aligned end 11' projected through an opening 21 provided by suitably notching a portion of each of the halves 12' and 13', the end 11' of the rod being rigidly affixed to and rigidly joining the sheet metal halves 12' and 13', by spot welding of the sheet metal halves to the rod at the points 22. In the second embodiment, also, the halves are preferably welded together at one or more other points disposed longitudinally along their meeting edges 16' and preferably remotely from the aperture 21. The reservoir comprising the shallow cup 1 has a diameter preferably twice that of its depth, exclusive of the depth of the cap 25 which is screw threaded by its peripheral tubular flange 26 onto the cooperatively threaded side walls of the cup adjacent its rim.

A piston follower, generally shown in Figure 2 at 27, is provided with a peripherally disposed leather cup, washer packing 28 having a short tubular flange 29 engageable with the cylindrical lateral walls 30 of the cup and its inturned radial flange 31 held clamped between the pair of superposed sheet metal discs 32 forming the body of the piston follower 27. The discs are centrally apertured and clamped between spaced annular shoulders 33 and 34 of a tubular guide and handle 35 carried by the central part of the follower, and which in turn is guided when moving longitudinally of the cup 30 by a guiding stem 36 rigidly affixed to the cap 25, centrally thereof, and projecting inwardly therefrom, and on which the unitary follower including the tubular handle 35 is telescopically slidable.

The cap 25 is bowed outwardly so that the guide and handle 35 projecting from the outer side of the piston 27 may project into the recess of the cap, while the piston is in its outermost position within the cup, as illustrated in Figure 2. This is the position assumed by the follower relative to the cup when the reservoir is full of lubricant, such as grease or oil; a sealing gasket 37 interposed between the upper edge of the cup 30 and the border portion of the cap prevents loss of lubricant such as may seep past the piston 27.

During use of the gun and as the supply of lubricant in the reservoir becomes progressively depleted the followers 27 will move axially of the reservoir on the rod 36 to perform the follower function of preventing the drawing of air instead of lubricant into the pressure cylinder 4.

Upon depletion of the supply of lubricant in the reservoir the cap 25, with the gasket 37 carried thereby and the rod 36 secured thereto is removed from the cup and the operator may then grasp the tubular handle 35 withdrawing the follower from the cup so that the cup may be refilled with lubricant.

Having thus described my invention in certain embodiments I am aware that numerous and extensive departures may be made from the said embodiments, but without departing from the spirit of my invention.

I claim:

1. In a tubular lubricant compressor of the contact type, a dispensing nozzle at one end, a piston and cylinder in lubricant communication therewith, a piston rod for the piston projecting from the other end of the compressor, a hand grip for the free end of the piston rod comprising a pair of sheet metal stampings having outer surfaces suitably formed, each to form a lateral surface of the hand grip and each rigidly affixed to an interposed portion of the rod.

2. In a lubricant compressor, having a thrust rod therefor projecting posteriorly thereof, a hand grip supported on the rod, said hand grip comprising a pair of complementary halves each independently secured to the rod.

3. In a lubricant compressor, having a thrust rod therefor projecting posteriorly thereof, a hand grip supported on the rod, said hand grip comprising a pair of complementary sheet metal halves, having their border edges in contiguous abutting relation.

4. In a lubricant dispensing gun including a tubular barrel, a piston reciprocable therein longitudinally thereof, a rod directly secured to the piston and projecting posteriorly of the barrel, a hand grip therefor comprising a pair of sheet metal stampings independently secured to the rod at opposite sides thereof.

5. In a lubricant dispensing gun, the combination with a tubular barrel, a piston reciprocable therein longitudinally thereof, a rod directly secured to the piston and projecting posteriorly of the barrel, a hand grip comprising a pair of sheet metal stampings independently secured to the rod, and a lubricant reservoir affixed to a lateral wall of the barrel and in lubricant communication therewith.

6. In combination with a lubricant compressor of the contact type, a hand grip therefor, a thrust rod projecting posteriorly of the compressor and terminating in an angularly disposed end, said hand grip comprising a pair of sheet metal stampings rigidly affixed to opposite sides of the angularly disposed end of the rod.

7. In combination with a lubricant gun having a tubular dispensing barrel, a separate lubricant reservoir in the form of a shallow cup, affixed to the barrel laterally thereof, a piston follower in the cup, said barrel having a nozzle at one end and a handle at the other end and means operative by a thrust effort of the handle against a restrained nozzle to eject lubricant under pressure from the barrel, means operative responsive to a retractive movement of the handle to supply lubricant to the barrel from the reservoir, an axially disposed guide rod for the follower and means supported by the follower telescopable relative to the guide rod, and forming a handle for the follower projecting outwardly therefrom, and manually engageable from the mouth of the cup in all positions of the piston therein, for removing the piston from the cup.

8. In a lubricant compressor having a thrust rod therefor projecting posteriorly thereof, a hand grip supported on the rod, said hand grip comprising a pair of complementary halves each independently secured to the rod, said grip being in the form of a pistol grip, and having a posteriorly disposed surface portion convexly rounded in transverse sections and concavely rounded in longitudinal sections to form a thrust surface for engagement by the hand intermediate the thumb and index finger, said thrust rod extending through the compressor in an extended radial direction of said surfaces.

9. In a lubricant compressor having a thrust rod therefor provided with an angularly disposed end portion projecting posteriorly thereof, a hand grip supported on the said end portion, said hand grip comprising a pair of complementary halves each in the form of a concavely formed sheet metal stamping with a reentrant intermediate portion, each independently secured to the rod by said intermediate portion.

10. In a lubricant compressor having a thrust rod therefor having an angularly disposed end portion projecting posteriorly theerof, a hand grip supported on the end portion, said hand grip comprising a pair of concavely formed sheet metal stampings having meeting edges, and intermediately disposed reentrant portions, said stamping secured to the rod by said portions.

11. In a lubricant compressor having a thrust rod therefor having an angularly disposed end portion projecting posteriorly thereof, and a hand grip supported on the end portion, said hand grip comprising a pair of elongated concavely formed sheet metal stampings having meeting edges, and intermediately disposed longitudinally extending reentrant portions, said stampings secured to the rod by longitudinally spaced portions of said reentrant portions.

12. A lubricant reservoir comprising a shallow cup, a follower therefor comprising a pair of centrally apertured superimposed discs and a leather packing ring secured between the peripheral portions of the discs and having a tubular flange, a tubular stem securing the discs together at their apertured centers and projecting axially toward the open end of the cup to form a handle and guide for the follower, a cap for said reservoir provided with an annular gasket for engaging the rim of said cup, and a guide rod affixed to the cap and disposed axially of the reservoir in telescoping relation to the stem, said cup having a dome-shaped portion for receiving said stem when the follower is in its retracted position in contact with a substantial quantity of lubricant in the reservoir.

OSCAR U. ZERK.

CERTIFICATE OF CORRECTION.

Patent No. 1,931,121.  October 17, 1933.

OSCAR U. ZERK.

It is hereby certified that error appears in the printed specification of the above numbered patent requiring correction as follows: Page 3, line 64, claim 5, before "lubricant" insert the words thin metal; and that the said Letters Patent should be read with this correction therein that the same may conform to the record of the case in the Patent Office.

Signed and sealed this 26th day of December, A. D. 1933.

Richard Spencer (Seal)  Acting Commissioner of Patents.